US008390585B2

(12) United States Patent  (10) Patent No.: US 8,390,585 B2
Hyun  (45) Date of Patent: Mar. 5, 2013

(54) METHOD AND DEVICE FOR RELEASING LOCK FUNCTION OF MOBILE TERMINAL

(75) Inventor: Sang Min Hyun, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 624 days.

(21) Appl. No.: 12/625,999

(22) Filed: Nov. 25, 2009

(65) Prior Publication Data

US 2010/0127998 A1    May 27, 2010

(30) Foreign Application Priority Data

Nov. 26, 2008   (KR) .......................... 10-2008-0118085

(51) Int. Cl.
 *G06F 3/041*  (2006.01)
(52) U.S. Cl. ....................................... 345/173; 715/863
(58) Field of Classification Search .................. None
See application file for complete search history.

(56) References Cited

U.S. PATENT DOCUMENTS

| 7,593,000 | B1 * | 9/2009 | Chin .............................. 345/156 |
| 7,657,849 | B2 * | 2/2010 | Chaudhri et al. .............. 715/863 |
| 8,127,254 | B2 * | 2/2012 | Lindberg et al. .............. 715/863 |
| 2008/0220752 | A1 * | 9/2008 | Forstall et al. ................ 455/415 |
| 2011/0316797 | A1 * | 12/2011 | Johansson ..................... 345/173 |

* cited by examiner

*Primary Examiner* — Jason Olson
(74) *Attorney, Agent, or Firm* — Jefferson IP Law, LLP

(57) ABSTRACT

A method and device for releasing a lock function of an input device of a mobile terminal are provided. The method of releasing a lock function of an input device of a mobile terminal includes detecting a user's input, determining whether the lock function of the input device is set, displaying, if it is determined that the lock function of the input device is set, display data representing that the input device is in a locked state and displaying function data of a function to be entered upon release of the lock function of the input device, and entering, immediately upon performance of a preset lock release operation, a specific function corresponding to the function data.

25 Claims, 5 Drawing Sheets

METHOD AND DEVICE FOR RELEASING LOCK FUNCTION OF MOBILE TERMINAL

PRIORITY

This application claims the benefit under 35 U.S.C. §119(a) of a Korean patent application filed in the Korean Intellectual Property Office on Nov. 26, 2008 and assigned Serial No. 10-2008-0118085, the entire disclosure of which is hereby incorporated by reference.

BACKGROUND OF THE INVENTION

1. Field of the Invention

The present invention relates to a mobile terminal. More particularly, the present invention relates to a method and device for releasing a lock function of an input device of a mobile terminal.

2. Description of the Related Art

Nowadays, mobile terminals are developed to perform functions such as an Internet connection and digital broadcasting reception as well as a communication function. When various functions of the mobile terminal are used, a user can input desired information to the mobile terminal through various input devices, and in order to avoid undesired input error, the mobile terminal has various locking and lock release functions of the input device.

In order to release a lock of the input device, in a conventional mobile terminal, a password set by a user may be input, or a separate lock release key of the input device may be input.

However, with these methods, the user may forget a password, and a user requiring a quick lock release may experience inconvenience. In a conventional lock release method, when a lock release function of the mobile terminal is complete, the mobile terminal enters an initial function menu, and thus when the user desires to use a further function, it is necessary for the user to further input a function selection.

SUMMARY OF THE INVENTION

An aspect of the present invention is to address at least the above-mentioned problems and/or disadvantages and to provide at least the advantages described below. Accordingly, an aspect of the present invention is to provide a method and device for conveniently releasing a locked state of an input device of a mobile terminal.

A further aspect of the present invention is to provide a method and device for immediately activating a function desired by a user upon release of a locked state of an input device of a mobile terminal.

In accordance with an aspect of the present invention, a method of releasing a lock function of an input device of a mobile terminal is provided. The method includes detecting a user's input, determining whether the lock function of the input device is set, displaying, if it is determined that the lock function of the input device is set, display data representing that the input device is in a locked state and displaying function data of a function to be entered upon release of the lock function of the input device, and entering, immediately upon performance of a preset lock release operation, a specific function corresponding to the function data.

In an exemplary implementation, the input device of the mobile terminal is a touch detection display device.

In an exemplary implementation, a user's input is an input into one of the touch detection display device and another input device.

In an exemplary implementation, the function data are function data corresponding to each of at least one function of the mobile terminal.

In an exemplary implementation, the at least one function of the mobile terminal includes at least one of a music function and an initial menu function.

In an exemplary implementation, the function data include a function to be entered according to the user's input and an arrow indicating a direction in which a touch of the user's finger of touching means on the touch detection display device must advance in order to release the locked state of the input device.

In an exemplary implementation, the arrow indicates one of a rotational direction and a straight line direction.

In an exemplary implementation, the preset lock release operation includes distinguishing a portion of the touch detection display device that one of the user's finger and touching means has touched when moving while touching in an arrow direction and a portion of the touch detection display device that the finger or touching means has not yet touched.

In an exemplary implementation, the distinguishing of the touched portion of the touch detection display device includes highlighting, on a semicircular touch area displayed on the touch detection display device, a touched portion of the semicircular touch area as a partial segment thereof.

In an exemplary implementation, the entering of the specific function corresponding to the function data includes displaying, immediately upon completion of the preset lock release operation, a user interface icon corresponding to the function data of the function to be entered.

In accordance with another aspect of the present invention, a mobile terminal having an input device is provided. The terminal includes a means for detecting a user's input, a means for determining whether a lock function of the input device is set, a means for displaying, if it is determined that a lock function of the input device is set, display data representing that the input device is in a locked state, and for displaying function data of a function to be entered upon release of the lock function of the input device, and a means for controlling to enter, immediately upon performance of a preset lock release operation, a specific function corresponding to the function data.

In an exemplary implementation, the input device of the mobile terminal is a touch detection display device.

In an exemplary implementation, the function data are function data corresponding to each of at least one function of the mobile terminal.

In an exemplary implementation, the at least one function of the mobile terminal includes a music function and a menu function.

In an exemplary implementation, the function data includes a function to be entered according to the user's input and an arrow indicating a direction in which a touch of at least one of the user's finger and touching means on the touch detection display device must advance in order to release the locked state of the input device.

In an exemplary implementation, the arrow indicates one of a rotational direction and a straight line direction.

In an exemplary implementation, the preset lock release operation includes moving one of a user's finger and touching means while touching on the touch detection display device in a direction of the arrow displayed thereon.

In an exemplary implementation, the mobile terminal displays to distinguish a portion of the touch detection display device that the user's finger touching means has touched when moving while touching in an arrow direction and a portion of the touch detection display device that the finger or touching means has not yet touched.

In an exemplary implementation, distinguishing a touched portion of the touch detection display device includes highlighting, on a semicircular touch area displayed on the touch detection display device, a touched portion of the semicircular touch area as a partial segment thereof.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In the following description, a mobile terminal according to exemplary embodiments of the present invention may be a terminal that can perform wireless communication while being carried, such as a mobile communication terminal, a Personal Communications Service (PCS) terminal, a Personal Digital Assistant (PDA), a smart phone, an International Mobile Telecommunication 2000 (IMT-2000) terminal, and a wireless Local Area Network (LAN) terminal.

Figure 1:
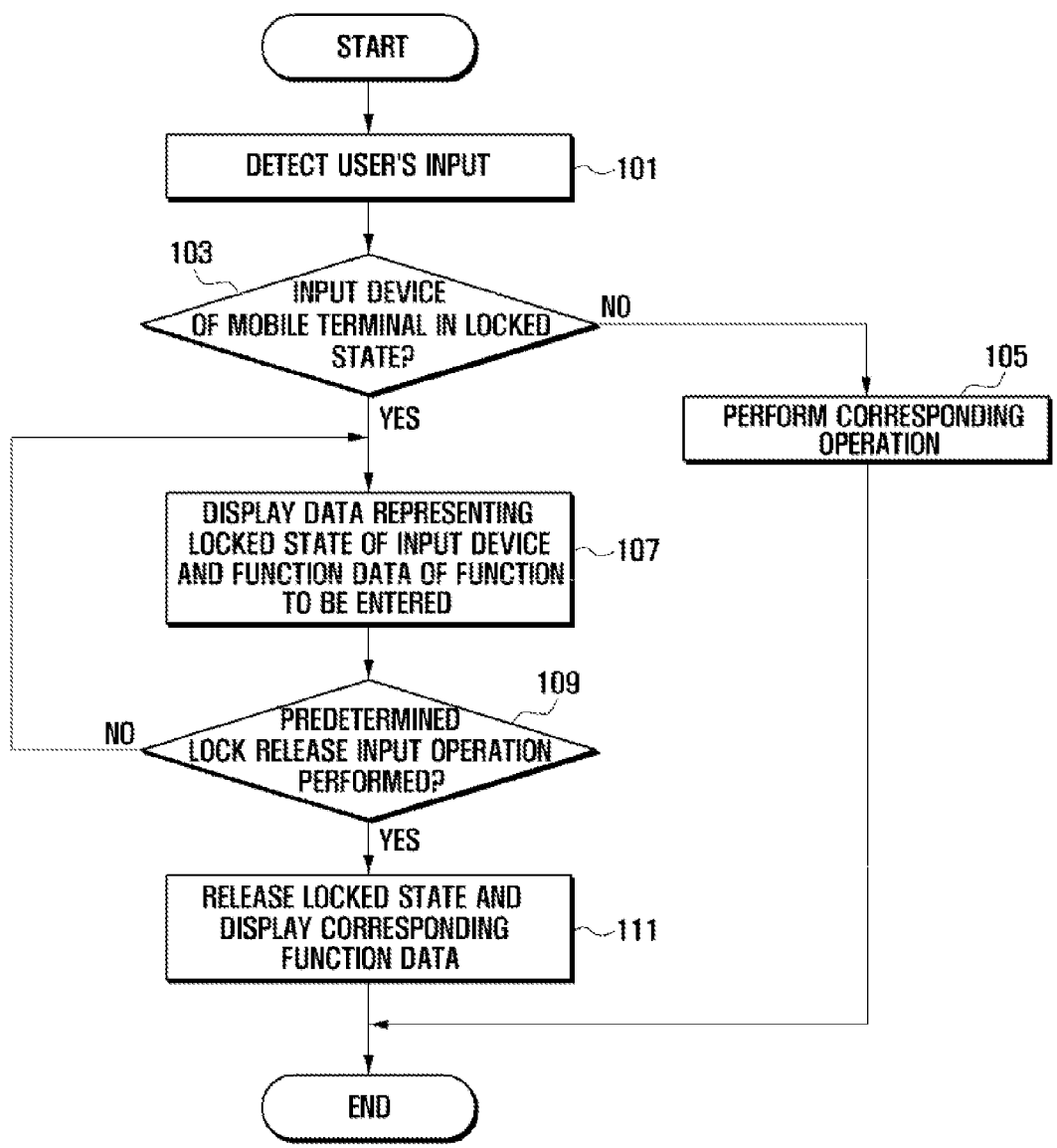
FIG. 1 is a flowchart illustrating a method for releasing a lock function of an input device of a mobile terminal according to an exemplary embodiment of the present invention.

FIG. 1 is a flowchart illustrating a method of releasing a lock function of an input device of a mobile terminal according to an exemplary embodiment of the present invention.

Referring to FIG. 1, when a user performs an input operation to an input device of the mobile terminal in order to perform a desired function, the mobile terminal detects the user's input in step 101. The input device of the mobile terminal may include alphanumeric keys, function keys and side keys, and may include a touch detection display device. The input device of the mobile terminal is not limited to a specific kind of input device, but includes all input devices.

The mobile terminal determines whether the input device of the mobile terminal is in a locked state in step 103.

If it is determined that the input device of the mobile terminal is not in a locked state, i.e. the terminal is in an unlocked state, the mobile terminal performs an operation corresponding to the use input in step 105. For example, the mobile terminal performs a corresponding operation such as entering an initial menu or displaying a preset standby screen.

In contrast, if it is determined that the input device of the mobile terminal is in a locked state, the mobile terminal displays data intuitively representing that the input device is in a locked state, and simultaneously displays function data of a preset function to be entered immediately upon release of a lock function in step 107. Here, the display data is data representing, in a convenient form such as an icon form, a picture, image or text by which a user can easily distinguish a locked state of the mobile terminal. The function data is data representing, in a convenient form such as an icon form, a picture, image or text by which the user can easily distinguish a function to be entered immediately upon release of the locked state of the input device. The function to be immediately entered is preset by the user, and the function data is data mapped on a function basis for each preset function according to user setting. Further, the function data includes data for guiding operation of releasing a locked state of the input device.

A function set to be entered immediately upon release of a lock function is not limited to one function but may be a plurality of functions, for example a music reproduction function, an initial menu display function, and a photographing function.

Further, if the input device of the mobile terminal is a touch detection display device, a function set to be entered immediately upon release of a lock function may be indicated by an arrow representing a direction in which a touch of a user's finger or touching means should advance in order to release a locked state of the input device. In this case, the arrow may be, for example, a rotational direction arrow or a straight line arrow.

The mobile terminal determines whether the user performs a preset lock release input operation for releasing the locked state of the input device of the mobile terminal in step 109.

If it is determined that a preset lock release input operation for releasing the locked state is performed, the mobile terminal releases the locked state and displays the corresponding function data in step 111. Operation of exemplary embodiments of the present invention is described through the following examples.

The preset lock release operation is a movement by the user's finger or a touching means, for example a stylus, while touching the touch detection display device, in an arrow direction displayed thereon.

In this case, in order for the user to know whether a touch operation for a lock release of the input device of the mobile terminal is correctly performed on a display while performing the touch operation, when the user's finger or stylus moves in an arrow direction while touching the display, the mobile terminal may display to distinguish a portion of the touch detection display device that the user's finger has already touched and a portion of the touch detection display device that the user's finger has not yet touched. A display for distinguishing a touch screen portion that the finger has passed through while touching the screen and a touch screen portion that the finger has not yet touched may be performed, for example, by highlighting a touched portion of a semicircular touch area on the touch detection display device as a partial segment of the semicircular area or as a strip around the circumference thereof. Detailed exemplary operations and screen examples of the present invention are described later.

If the user performs the preset lock release input operation for releasing the locked state of the input device of the mobile terminal at step 109, the mobile terminal displays function data corresponding to the function that the user desires to enter while releasing the locked state on a touch detection display screen. For example, when the user enters a music reproduction function after releasing the locked state, icons such as a music reproduction key and a quick reproduction key according to a user interface of the music reproduction function can be displayed.

In, contrast, if it is determined that a preset lock release input operation for releasing the locked state is not performed, the mobile terminal returns to step 107.

Figure 2:
FIG. 2 is a view illustrating a locked state display of an input device and a picture display of a desired function to be entered in a mobile terminal according to an exemplary embodiment of the present invention.

FIG. 2 is a view illustrating a locked state display of an input device and a picture display of a desired function to be entered in a mobile terminal according to an exemplary embodiment of the present invention. Specifically, FIG. 2 is a diagram illustrating a locked state display and a desired function to be entered in the input device in a process of releasing the locked state of the input device of the mobile terminal using a picture display.

Referring to FIG. 2, the mobile terminal is in a locked state and intuitively displays that it is necessary for a user to move the user's finger or touching means while touching a displayed input device of a touch detection display in an arrow direction in order to release the locked state of the input device. In FIG. 2, the locked state may be recognized through display of a key shape icon.

A word, for example the word 'MUSIC', is displayed representing a music reproduction function to be entered, while releasing the locked state of the input device, by moving a finger while touching in an arrow direction indicating a clockwise motion in an upper semicircle direction of the input device. Further, a word, for example the word 'MENU', is displayed representing a menu display screen function to be entered, while releasing the locked state of the input device, by moving a finger while touching in an arrow direction indicating an anticlockwise motion in the upper semicircle of the input device. Here, the word 'MUSIC' and the word 'MENU' correspond to the function data.

Figure 3A:
FIGS. 3A and 3B are views illustrating a lock release operation of an input device in a mobile terminal according to an exemplary embodiment of the present invention.
Figure 3B:
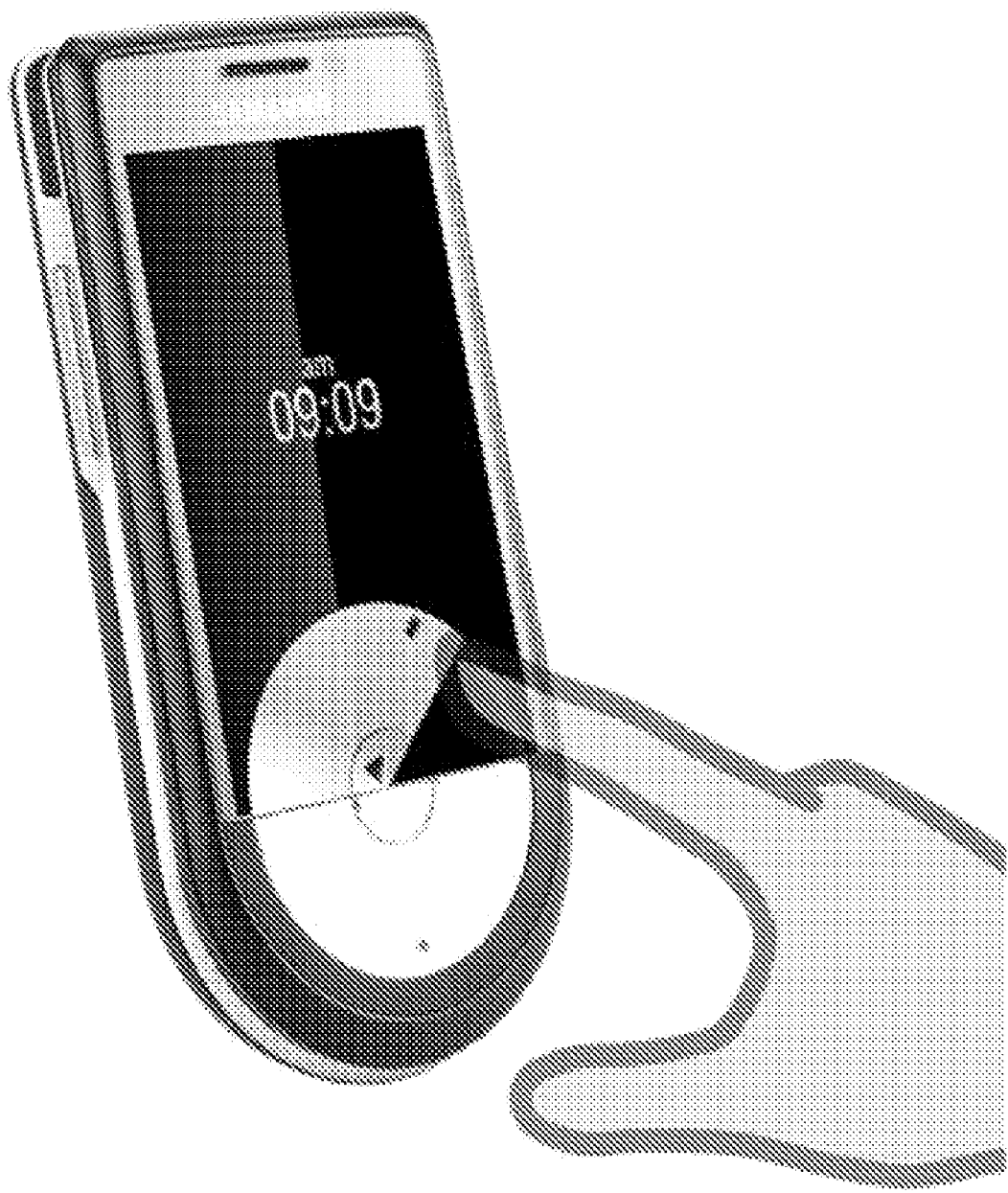

FIGS. 3A and 3B are views illustrating a lock release operation of an input device in a mobile terminal according to an exemplary embodiment of the present invention.

Referring to FIGS. 3A and 3B, in order to release the locked state of the input device, the user moves a finger to draw an upper semicircle in a clockwise direction while touching the touch detection display device, and in order to distinguish a touched portion and an untouched portion of the touch detection display device, a touched portion of an upper semicircular area of the touch detection display is highlighted as a partial segment of the semicircular area.

Alternatively, in order to distinguish a touched portion and an untouched portion of the touch detection display device, a touched portion of an upper semicircular area of the touch detection display may be highlighted as a strip around the circumference of the semicircular area.

Figure 4:
FIG. 4 is a view illustrating a complete state of a lock release operation of an input device in a mobile terminal according to an exemplary embodiment of the present invention.

FIG. 4 is a view illustrating a complete state of a lock release operation of an input device in a mobile terminal according to an exemplary embodiment of the present invention.

Referring to FIG. 4, when a locked state of the input device is released, the lock display picture, i.e. the display data, disappears, and a user interface icon (here, a music reproduction key and quick movement key) related to a music reproduction function that the user desires to immediately execute after a lock of the input device is released, i.e. function data, is displayed.

As described above, the mobile terminal having a lock release function of the input device according to an exemplary embodiment includes a means for detecting a user's input, a means for determining whether a lock function of the input device is set, a means for displaying, if it is determined that a lock function of the input device is set, display data representing that the input device is in a locked state, and displaying function data of a function to be entered upon release of the lock function of the input device, and a means for controlling to enter, immediately upon completion of a preset lock release operation, a specific function corresponding to the function data. The input device of the mobile terminal is a touch detection display device.

Further, when the mobile terminal releases the lock function, a plurality of functions related to the entered function of the mobile terminal are displayed. The entered function of the mobile terminal includes a music function and a menu function. The function data includes a function that a user desires to enter and an arrow indicating a direction in which a touch of the user's finger or touching means should advance in order to release a locked state. The arrow may indicate a rotational direction, a straight line direction, or a random direction.

A locked state display picture (display data) and a desired entered function picture (function data) of the mobile terminal are displayed within a semicircular touch area displayed on the touch detection display device. Further, the semicircular touch area displayed on the touch detection display device may form a complete circular shape in combination with a semicircular input device positioned outside, and adjoined to, the touch detection display device, as shown in FIGS. 2 to 4. The semicircular input device is used as a separate input device.

The preset lock release operation of the input device includes moving the user's finger or touching means, for example a stylus, while touching the touch detection display device, in an arrow direction displayed thereon.

The mobile terminal displays to distinguish a portion of the touch detection display device that the user's finger has already touched when moving while touching in an arrow direction and a portion of the touch detection display device that the user's finger has not yet touched. The distinguishing display may be performed, for example, in a form in which a touched portion of a semicircular touch area on the touch detection display device is highlighted as a partial segment of the semicircular area.

As described above, when using a mobile terminal according to exemplary embodiments of the present invention, a user can conveniently release a locked state of an input device of the mobile terminal and quickly enter a function of the mobile terminal having high use frequency by user setting.

The above-described methods according to the present invention can be realized in hardware or as software or computer code that can be stored in a recording medium such as a CD ROM, a RAM, a floppy disk, a hard disk, or a magneto-optical disk or downloaded over a network, so that the methods described herein can be executed by such software using a general purpose computer, or a special processor or in programmable or dedicated hardware, such as an ASIC or FPGA. As would be understood in the art, the computer, the processor or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein.

While the invention has been shown and described with reference to certain exemplary embodiments thereof, it will be understood by those skilled in the art that various changes in form and details may be made therein without departing from the spirit and scope of the invention as defined in the appended claims and their equivalents.

What is claimed is:

1. A method of releasing a lock function of an input device of a mobile terminal, the input device including a touch detection display device, the method comprising:
    detecting a user's input;
    determining whether the lock function of the input device is set;
    displaying, if it is determined that the lock function of the input device is set, display data representing that the input device is in a locked state and displaying function data of a function to be entered upon release of the lock function of the input device; and
    entering, immediately upon performance of a preset lock release operation, a specific function corresponding to the function data,
    wherein the preset lock release operation comprises moving at least one of a user's finger and a touching means while touching on the touch detection display device and distinguishing, on a semicircular touch area displayed on the touch detection display device, a touched portion of the semicircular touch area as a partial segment thereof.

2. The method of claim 1, wherein a user's input is an input through one of the touch detection display device and another input device.

3. The method of claim 1, wherein the display data comprises an icon formed with one of a picture, an image, and a text that represents a locked state of the input device.

4. The method of claim 1, wherein the function data are function data corresponding to each of at least one function of the mobile terminal.

5. The method of claim 4, wherein the at least one function of the mobile terminal comprises at least one of a music function and an initial menu function.

6. The method of claim 4, wherein the function data comprises a function to be entered according to the user's input and an arrow indicating a direction in which the touching by the one of the user's finger and the touching means on the touch detection display device of the input device must advance in order to release the locked state of the input device.

7. The method of claim 6, wherein the arrow indicates at least one of a rotational direction and a straight line direction.

8. The method of claim 1, wherein the touching on the touch detection display device occurs in a direction of an arrow displayed thereon.

9. The method of claim 8, wherein the arrow indicates a rotational direction.

10. The method of claim 1, wherein the distinguishing further comprises distinguishing between a portion of the touch detection display device that the at least one of the user's finger and the touching means has touched when moving while touching in an arrow direction, and a portion of the touch detection display device that the at least one of the user's finger and touching means has not yet touched.

11. The method of claim 1, wherein the distinguishing comprises highlighting.

12. The method of claim 1, wherein the semicircular touch area displayed on the touch detection display device forms a complete circular shape in combination with a semicircular input device positioned outside, and adjoined to, the touch detection display device.

13. The method of claim 1, wherein the entering of the specific function corresponding to the function data comprises displaying, immediately upon completion of the preset lock release operation, a user interface icon corresponding to the function data of the function to be entered.

14. A mobile terminal having an input device, the terminal comprising:
    a means for detecting a user's input including a touch detection display device;
    a means for determining whether a lock function of the input device is set;
    a means for displaying, if it is determined that a lock function of the input device is set, display data representing that the input device is in a locked state, and for displaying function data of a function to be entered upon release of the lock function of the input device; and
    a means for controlling to enter, immediately upon performance of a preset lock release operation, a specific function corresponding to the function data,
    wherein the preset lock release operation comprises moving at least one of a user's finger and a touching means while touching on the touch detection display device and distinguishing, on a semicircular touch area displayed on the touch detection display device, a touched portion of the semicircular touch area as a partial segment thereof.

15. The terminal of claim 14, wherein the function data is function data corresponding to each of at least one function of the mobile terminal.

16. The terminal of claim 15, wherein the at least one function of the mobile terminal comprises a music function and a menu function.

17. The terminal of claim 15, wherein the function data comprises a function to be entered according to the user's input and an arrow indicating a direction in which the touching of the at least one of the user's finger and the touching means on the touch detection display device of the input device must advance in order to release the locked state of the input device.

18. The terminal of claim 17, wherein the arrow indicates one of a rotational direction and a straight line direction.

19. The terminal of claim 14, wherein the touching on the touch detection display device occurs in a direction of an arrow displayed thereon.

20. The terminal of claim 19, wherein the arrow indicates a rotational direction.

21. The terminal of claim 14, wherein the distinguishing further comprises distinguishing between a portion of the touch detection display device that the at least one of the user's finger and the touching means has touched when moving while touching in an arrow direction and a portion of the touch detection display device that the at least one of the user's finger and touching means has not yet touched.

22. The terminal of claim 14, wherein the terminal, to distinguish the touched portion of the touch detection display device, uses highlights.

23. The terminal of claim 14, wherein the semicircular touch area displayed on the touch detection display device forms a complete circular shape in combination with a semicircular input device positioned outside, and adjoined to, the touch detection display device.

24. The terminal of claim 14, wherein the control means displays, immediately upon completion of the preset lock release operation, a user interface icon corresponding to the function data.

25. A non-transitory computer readable recording medium having recorded thereon a computer program for executing the method of claim 1.

* * * * *